US012583231B2

(12) United States Patent
Okumura

(10) Patent No.: US 12,583,231 B2
(45) Date of Patent: Mar. 24, 2026

(54) LIQUID SUPPLY DEVICE AND LIQUID SUPPLY METHOD

(71) Applicant: BROTHER KOGYO KABUSHIKI KAISHA, Nagoya (JP)

(72) Inventor: Yuki Okumura, Iwakura (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 128 days.

(21) Appl. No.: 18/426,633

(22) Filed: Jan. 30, 2024

(65) Prior Publication Data

US 2024/0253359 A1     Aug. 1, 2024

(30) Foreign Application Priority Data

Jan. 31, 2023    (JP) ................................. 2023-013197

(51) Int. Cl.
| | |
|---|---|
| B41J 2/175 | (2006.01) |
| B41J 2/165 | (2006.01) |
| C09D 11/107 | (2014.01) |
| C09D 11/30 | (2014.01) |

(52) U.S. Cl.
CPC ......... B41J 2/17566 (2013.01); B41J 2/1752 (2013.01); C09D 11/107 (2013.01); C09D 11/30 (2013.01)

(58) Field of Classification Search
CPC ..... B41J 2/1756; B41J 2/16552; B41J 2/1752
See application file for complete search history.

(56) References Cited

FOREIGN PATENT DOCUMENTS

| | | |
|---|---|---|
| JP | 2006015637 A | 1/2006 |
| JP | 2009073002 A | 4/2009 |
| JP | 2012232447 A | 11/2012 |

*Primary Examiner* — Jason S Uhlenhake
(74) *Attorney, Agent, or Firm* — Element IP, PLC

(57) ABSTRACT

A liquid supply device includes: a cartridge mounting portion configured to allow a cartridge to be mounted therein; a tank; a head configured to eject an ink supplied from the tank; a first liquid supply channel connecting the cartridge mounting portion and the tank; a second liquid supply channel connecting the tank and the head; and a controller. The cartridge includes a first cartridge storing the ink and a second cartridge storing a preservation solution. The controller is configured to: cause, in a recording mode, the ink to be stored in the tank such that a maximum liquid level of the ink is a first liquid level; and cause, on condition of receiving a command of a preservation mode, the preservation solution to be supplied from the second cartridge to the tank so as to reach a second liquid level higher than the first liquid level.

14 Claims, 9 Drawing Sheets

(CONT.)

(FIG. 7 CONTINUED)
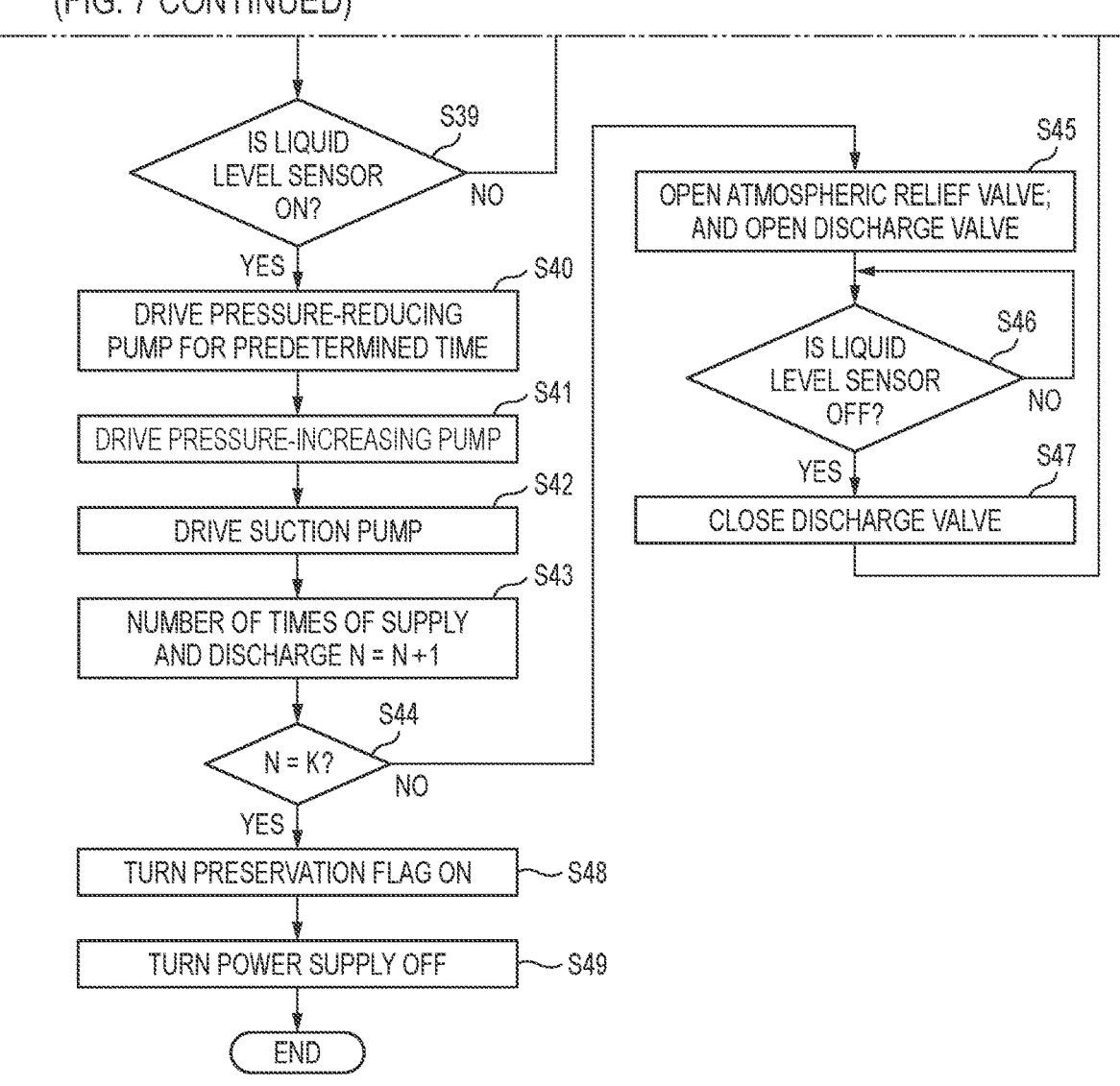

LIQUID SUPPLY DEVICE AND LIQUID SUPPLY METHOD

REFERENCE TO RELATED APPLICATIONS

This application claims priority from Japanese Patent Application No. 2023-013197 filed on Jan. 31, 2023. The entire content of the priority application is incorporated herein by reference.

BACKGROUND ART

The present disclosure relates to a liquid supply device in which an ink and a preservation solution are stored in a tank.

As an example of a liquid ejection device for ejecting an ink from a head, JP2012-232447A discloses an ink jet recording apparatus. The recording apparatus disclosed in JP2012-232447A includes a recording head, an ink tank, and a supply channel connecting the recording head and the ink tank.

DESCRIPTION

An ink containing a pigment or an ink containing a resin for the purpose of fixing to a non-permeable medium solidifies when a solvent thereof evaporates. The ink solidified in the ink tank may cause an erroneous operation of a sensor or the like.

The present disclosure has been made in view of the above-described circumstances, and an object thereof is to provide a device for removing ink adhering to a wall surface of a tank.

(1) A liquid supply device according to the present disclosure includes: a cartridge mounting portion configured to allow a cartridge to be mounted therein; a tank; a head configured to eject an ink supplied from the tank; a first liquid supply channel connecting the cartridge mounting portion and the tank; a second liquid supply channel connecting the tank and the head; and a controller. The cartridge includes a first cartridge storing the ink and a second cartridge storing a preservation solution. The controller is configured to: cause, in a recording mode, the ink to be stored in the tank such that a maximum liquid level of the ink is a first liquid level; and cause, on condition that the controller receives a command of a preservation mode, the preservation solution to be supplied from the second cartridge to the tank through the first liquid supply channel so as to reach a second liquid level higher than the first liquid level.

In a recording mode, the ink may adhere to a wall surface up to near a first liquid level in a tank. In a preservation mode, since a preservation solution is supplied to a second liquid level higher than the first liquid level, the ink remaining on the wall surface of the tank can be removed by the preservation solution.

(2) The liquid supply device may further include a discharge channel through which a liquid is allowed to be discharged from the tank, and the controller may be configured to, in the preservation mode, control a pressure in the tank to perform supply and discharge processing of repeating supply and discharge of the preservation solution between the tank and the discharge channel.

Since supply and discharge of the preservation solution are repeated between the tank and a discharge channel, the preservation solution is brought into dynamic contact with the ink remaining on the wall surface of the tank. Accordingly, the ink remaining on the wall surface of the tank is easily removable.

(3) The liquid supply device may further include a sensor configured to detect a liquid level in the tank reaching a third liquid level lower than the first liquid level, and the controller may be configured to, in the recording mode, cause the ink to be supplied from the first cartridge to the tank through the first liquid flow channel in response to a detection signal output from the sensor.

(4) The controller may be configured to cause the preservation solution to be discharged from the tank until the liquid level in the tank reaches a fourth liquid level lower than the third liquid level in the supply and discharge processing.

In the recording mode, since a liquid level of the preservation solution fluctuates in an up-down direction outside a range in which liquid levels of the ink are present in the tank in the recording mode, the ink adhering to the wall surface of the tank is hard to remain.

(5) The controller may be configured to: obtain, after the preservation mode is executed, an elapsed time from when the ink is supplied to the tank in the recording mode to when the command of the preservation mode is received again, and determine, in accordance with the elapsed time, a number of time of repeating supply and discharge in the supply and discharge processing in the preservation mode.

As an elapsed time increases, the amount of ink remaining on the wall surface of the tank tends to increase. When the number of times of repetition increases as the elapsed time increases, the number of times of dynamic contact of the preservation solution with the remaining ink on the wall surface of the tank increases in accordance with the amount of ink remaining on the wall surface of the tank.

(6) The controller may be configured to: obtain, after the preservation mode is executed, an elapsed time from when the ink is supplied to the tank in the recording mode to when the command of the preservation mode is received again; and determine, in accordance with the elapsed time, a flow rate of the preservation solution in the supply and discharge processing in the preservation mode.

As the elapsed time increases, the amount of ink remaining on the wall surface of the tank tends to increase. When a flow rate of the preservation solution increases as the elapsed time increases, a speed at which the preservation solution dynamically comes into contact with the ink remaining on the wall surface of the tank increases in accordance with the amount of ink remaining on the wall surface of the tank.

(7) The controller may be configured to: obtain, after the preservation mode is executed, an elapsed time from when the ink is supplied to the tank in the recording mode to when the command of the preservation mode is received again, and change, in accordance with the elapsed time, the second liquid level, the fourth liquid level, or both in the preservation mode.

As the elapsed time increases, the amount of ink remaining on the wall surface of the tank tends to increase. When the second liquid level increases or the fourth liquid level decreases as the elapsed time increases, the speed at which the preservation solution dynamically comes into contact with the ink remaining on the wall surface of the tank increases in accordance with the amount of ink remaining on the wall surface of the tank.

(8) The controller may be configured to, on condition that the controller receives the command of the preservation mode, return the ink from the tank to the first cartridge mounted in the cartridge mounting portion through the first liquid flow channel, before supplying the preservation solution from the second cartridge to the tank through the first liquid supply channel.

By returning the ink from the tank to the first cartridge, the amount of ink discarded in the preservation mode is small. In addition, it is easy to replace a liquid in the head, the first liquid flow channel, and the second liquid flow channel with the preservation solution.

(9) The ink may contain a coloring material, an organic solvent, a surfactant, and water, and the preservation solution may contain an organic solvent, a surfactant, and water.

(10) The coloring material may be a pigment, and the ink may further contain a resin fine particle.

(11) The preservation solution may further contain a water-soluble polymer.

(12) The resin fine particle may contain an acrylic resin.

(13) The present disclosure provides a liquid supply method for a liquid supply device in which an ink is supplied from an ink cartridge mounted in a cartridge mounting portion to a tank and the ink supplied from the tank is ejected by a head, the liquid supply method including: supplying, in a recording mode, the ink from the ink cartridge to the tank such that a maximum liquid level of the ink is a first liquid level; and supplying, in a preservation mode, a preservation solution from a preservation solution cartridge mounted in the cartridge mounting portion to the tank so as to reach a second liquid level higher than the first liquid level.

According to the present disclosure, an ink adhering to a wall surface of a tank is removed.

Figure 1:
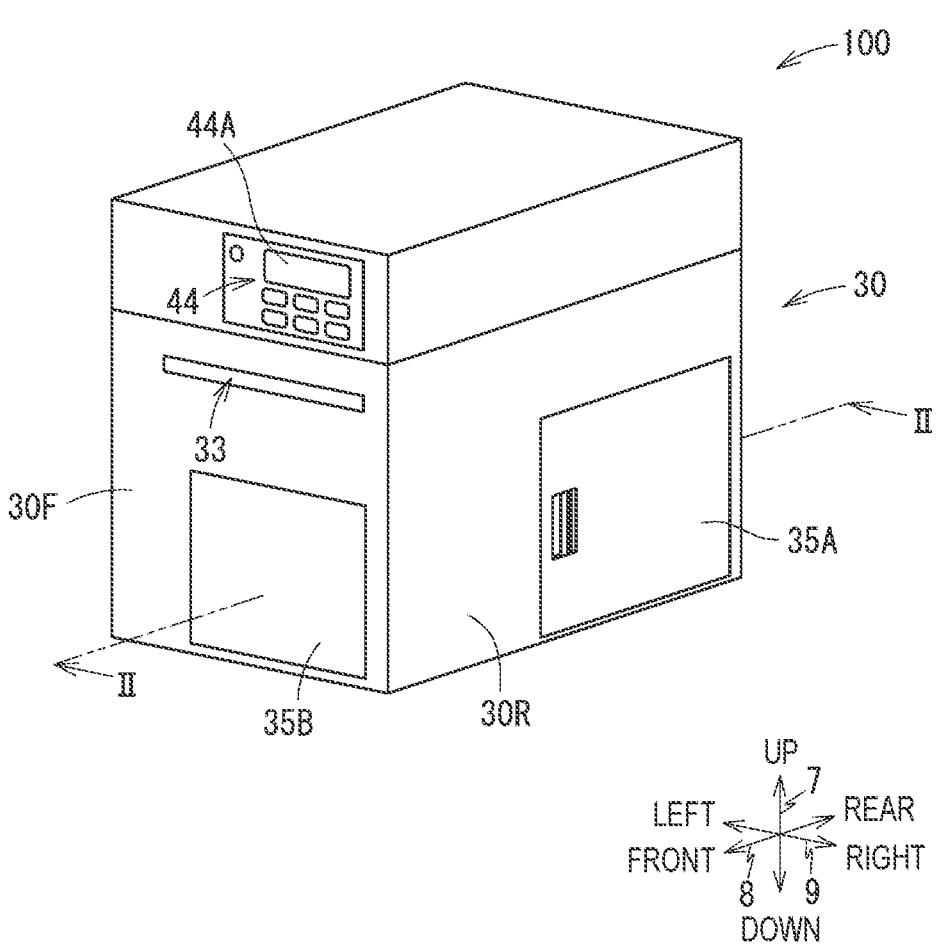
FIG. 1 is an external perspective view of an image recording apparatus 100 according to an embodiment of the present disclosure.

Embodiments of the present disclosure will be described below. The present embodiment is merely an embodiment of the present disclosure, and it goes without saying that the embodiment can be changed without departing from the scope of the present disclosure. In the following description, advancement from a start point to an end point of an arrow is expressed as a direction, and coming and going on a line connecting the start point and the end point of the arrow are expressed as directions. In the following description, an up-down direction 7 is defined with reference to a state in which an image recording apparatus 100 is installed in a manner of being usable (the state in FIG. 1), a front-rear direction 8 is defined with a side, on which a discharge port 33 is provided, as a front side (front surface), and a left-right direction 9 is defined when the image recording apparatus 100 is viewed from the front side (front surface).

External Configuration of Image Recording Apparatus 100

The image recording apparatus 100 (an example of a liquid supply device) illustrated in FIG. 1 records an image on a sheet S, which forms a roll body 37 (see FIG. 2), by an ink jet recording method.

As illustrated in FIG. 1, the image recording apparatus 100 includes a casing 30. The casing 30 has a substantially rectangular parallelepiped shape as a whole. A frame for supporting each member may be appropriately provided inside the casing 30.

A slit-like discharge port 33 elongated in the left-right direction 9 is formed on a front surface 30F of the casing 30. An image-recorded sheet S (see FIG. 2) is discharged from the discharge port 33. An operation panel 44 is provided on the front surface 30F. A user performs an input operation on the operation panel 44 for operating the image recording apparatus 100 or determining various settings.

A right cover 35A is positioned at a right surface 30R of the casing 30. A holder 35 and the like (see FIG. 2) positioned in a sheet accommodating space 32C are exposed or shielded by opening and closing the right cover 35A.

A front cover 35B is positioned at the front surface 30F of the casing 30. The front cover 35B can be opened around a pivot shaft (not shown) extending along the left-right direction 9 in the vicinity of a lower end thereof such that an upper end side thereof is tilted forward. A cartridge mounting portion 110 and the like (see FIG. 2) positioned in an internal space 31 of the casing 30 are exposed or shielded by opening and closing the front cover 35B.

Internal Configuration of Image Recording Apparatus 100

Figure 2:
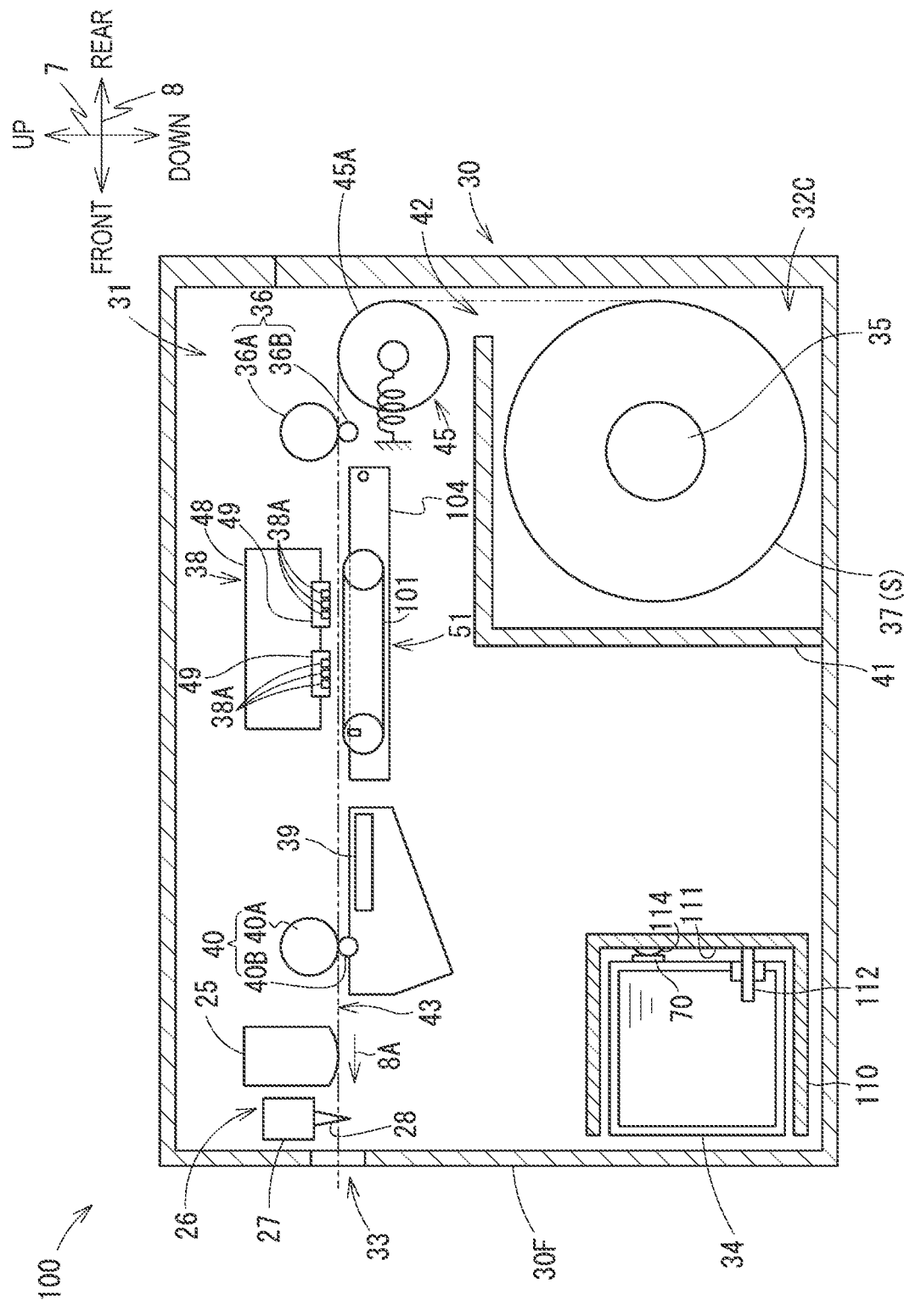
FIG. 2 is a cross-sectional view taken along a line II-II in FIG. 1.

As illustrated in FIG. 2, the holder 35, a tensioner 45, a conveying roller pair 36, a conveying roller pair 40, a head 38, a platen 51, a heater 39, a CIS 25, a cutter unit 26, the cartridge mounting portion 110, and the like are disposed in the internal space 31 of the casing 30. Although not shown in FIG. 2, a maintenance mechanism and the like may be positioned in the internal space 31.

A partition wall 41 is provided in the internal space 31. The partition wall 41 partitions a rear lower portion of the internal space 31 to define the sheet accommodating space 32C. The sheet accommodating space 32C is a space surrounded by the partition wall 41 and casing 30 and isolated from the head 38 and the like.

The tensioner 45 is positioned above the partition wall 41 in a rear portion of the internal space 31. The tensioner 45 has an outer peripheral surface 45A. The outer peripheral surface 45A has a size equal to or greater than a maximum width of the sheet in the left-right direction 9, and has a symmetrical shape with respect to a sheet passing center (a center of the sheet S in the left-right direction 9). An upper end of the outer peripheral surface 45A is positioned at substantially the same position as a nip position of the conveying roller pair 36 in the up-down direction 7.

The sheet S drawn out from the roll body 37 is conveyed onto the outer peripheral surface 45A. The sheet S curves forward along the outer peripheral surface 45A, extends in a conveyance direction 8A, and is guided by the conveying roller pair 36. The conveyance direction 8A is a forward direction along the front-rear direction 8. The tensioner 45 applies tension to the sheet S by a well-known method.

The conveying roller pair 36 is positioned in front of the tensioner 45. The conveying roller pair 36 includes a conveying roller 36A and a pinch roller 36B. The conveying roller 36A and the pinch roller 36B are in contact at substantially the same position as the upper end of the outer peripheral surface 45A in the up-down direction.

The conveying roller pair 40 is positioned in front of the conveying roller pair 36. The conveying roller pair 40 includes a conveying roller 40A and a pinch roller 40B. The conveying roller 40A and the pinch roller 40B are in contact at substantially the same position as the upper end of the outer peripheral surface 45A in the up-down direction.

The conveying rollers 36A and 40A are rotated by a driving force transmitted from a motor (not shown). The conveying roller pair 36 rotates while nipping the sheet S extending in the conveyance direction 8A from the tensioner 45, thereby feeding the sheet S in the conveyance direction 8A along a conveying path 43. The conveying roller pair 40 rotates while nipping the sheet S fed from the conveying roller pair 36, thereby feeding the sheet S in the conveyance direction 8A. Further, the sheet S is drawn from the sheet accommodating space 32C toward the tensioner 45 through a gap 42 by the rotation of the conveying roller pairs 36 and 40.

As illustrated in FIG. 2, the conveyance path 43 extending from the upper end of the outer peripheral surface 45A to the discharge port 33 is formed in the internal space 31. The conveyance path 43 extends substantially linearly along the conveyance direction 8A and is a space through which the sheet S can pass. In FIG. 2, the conveyance path 43 is indicated by a two-dot chain line. The conveyance path 43 is defined by guide members (not shown), the head 38 and the platen 51, and the like positioned away from each other in the up-down direction 7.

The head 38 is positioned above the conveyance path 43 and downstream of the conveying roller pair 36 in the conveyance direction 8A. The head 38 includes an ejection module 49 having a plurality of nozzles 38A. The plurality of nozzles 38A eject an ink (an example of a liquid) supplied from an ink tank 181 (an example of the tank, see FIG. 3) downward toward the sheet S supported by a conveying belt 101. Accordingly, an image is recorded on the sheet S.

The platen 51 is positioned below the conveyance path 43 and downstream of the conveying roller pair 36 in the conveyance direction 8A. The platen 51 faces the head 38 from below the head 38. The platen 51 includes the conveying belt 101 and a support 104. The conveying belt 101 supports the sheet S that is positioned immediately below the head 38 by being conveyed in the conveyance direction 8A by the conveying roller pair 36. The conveying belt 101 conveys the supported sheet S in the conveyance direction 8A.

The heater 39 is positioned below the conveyance path 43, downstream of the head 38 in the conveyance direction 8A and upstream of the conveying roller pair 40 in the conveyance direction 8A. The heater 39 heats the sheet S conveyed through the conveyance path 43.

The CIS 25 is positioned above the conveyance path 43 and downstream of the conveying roller pair 40 in the conveyance direction 8A. The CIS 25 reads an image of a printing surface of the sheet.

The cutter unit 26 is positioned above the conveyance path 43 and downstream of the CIS 25 in the conveyance direction 8A. The cutter unit 26 includes a cutter 28 mounted on a cutter carriage 27 thereof. Due to movement of the cutter 28, the sheet S positioned in the conveyance path 43 is cut along the left-right direction 9.

Figure 3:
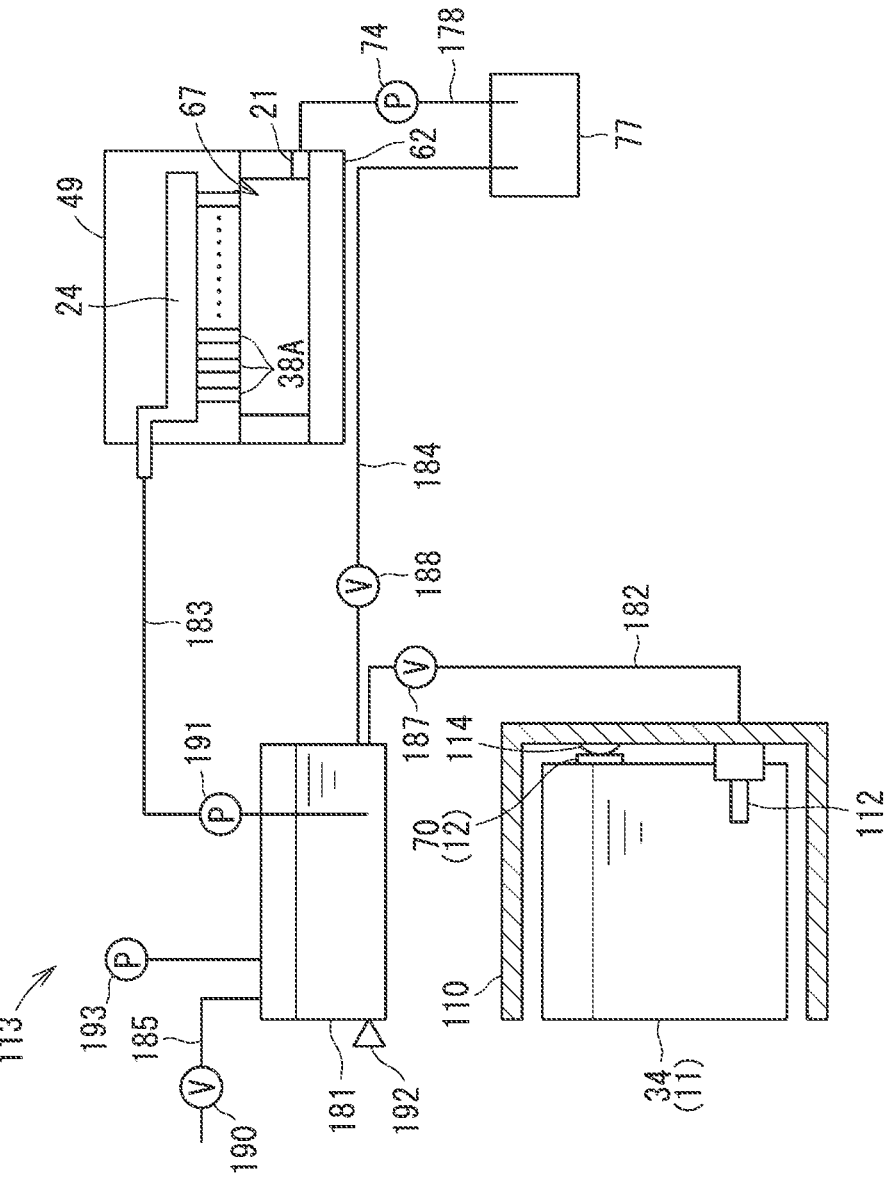
FIG. 3 is a schematic diagram illustrating an ink circuit 113.

The cartridge mounting portion 110 is positioned in the vicinity of a front end and a lower end of the casing 30, and has a box shape whose front side is open. An ink cartridge 34 is inserted rearward in the cartridge mounting portion 110. An ink needle 112 extending forward is positioned on a rear end surface 111 of the cartridge mounting portion 110. As illustrated in FIG. 3, the ink needle 112 communicates with the ink tank 181 through a flow channel 182.

A contact 114 is positioned on the end surface 111. The contact 114 is electrically connected to an IC board 70 of the ink cartridge 34 in a state where the ink cartridge 34 is mounted in the cartridge mounting portion 110. A controller 130 can access a storage area of the IC board 70 through the contact 114. The contact 114 is electrically connected to an IC board 12 of a preservation solution cartridge 11 in a state where the preservation solution cartridge 11 is mounted in the cartridge mounting portion 110. The controller 130 can access a storage area of the IC board 12 through the contact 114.

The ink cartridge 34 (an example of a first cartridge) stores an ink. When the ink is consumed, the ink cartridge 34 is detached from the cartridge mounting portion 110 and is replaced with a new ink cartridge 34 storing the ink. The IC board 70 is positioned on a rear surface of the ink cartridge 34. The IC board 70 stores identification information indicating the ink cartridge 34 in the storage area.

In the cartridge mounting portion 110, the preservation solution cartridge 11 (second cartridge) is inserted instead of the ink cartridge 34. The preservation solution cartridge 11 stores a preservation solution. The preservation solution cartridge 11 is mounted in the cartridge mounting portion 110 in place of the ink cartridge 34 when the image recording apparatus 100 is to be preserved for a long period of time without being used. As illustrated in FIG. 3, the IC board 12 is positioned on a rear surface of the preservation solution cartridge 11. The IC board 12 stores identification information indicating the preservation solution cartridge 11 in the storage area.

Ink Circuit 113

As illustrated in FIG. 3, the cartridge mounting portion 110 and the ejection module 49 are connected by an ink circuit 113. The ink circuit 113 includes the ink tank 181, flow channels 182 and 183, an atmospheric air flow channel 185, a replenishment valve 187, an atmospheric relief valve 190, a pressure-increasing pump 191, and a liquid level sensor 192. The flow channel 182 is an example of a first liquid supply channel. The flow channel 183 is an example of a second liquid supply channel. The liquid level sensor 192 is an example of a sensor.

The ink tank 181 is positioned above the cartridge mounting portion 110 in the internal space 31 of the casing 30. The ink tank 181 stores the ink in an internal space thereof. The internal space of the ink tank 181 communicates with the ink needle 112 of the cartridge mounting portion 110 through the flow channel 182. In a state where the ink cartridge 34 is mounted in the cartridge mounting portion 110, the ink stored in the ink cartridge 34 can flow into the ink tank 181 through the flow channel 182. In a state where the preservation solution cartridge 11 is mounted in the cartridge mounting portion 110, the preservation solution stored in the preservation solution cartridge 11 can flow into the ink tank 181 through the flow channel 182. The replenishment valve 187 is positioned in the flow channel 182. The replenishment valve 187 is controlled by the controller 130 to open and close the flow channel 182.

The internal space of the ink tank 181 and the ejection module 49 communicate with each other through the flow channel 183. The ink or preservation solution stored in the internal space of the ink tank 181 can be supplied to the ejection module 49 through the flow channel 183. The pressure-increasing pump 191 is positioned in the flow channel 183. The pressure-increasing pump 191 is operated by the controller 130 controlling driving of a pump motor 138 (see FIG. 4).

The internal space of the ink tank 181 and an outside communicate with each other through the atmospheric air flow channel 185. The atmospheric relief valve 190 is positioned in the atmospheric air flow channel 185. The atmospheric relief valve 190 is controlled by the controller 130 to open and close the atmospheric air flow channel 185.

The liquid level sensor 192 is positioned at the ink tank 181. The liquid level sensor 192 detects presence or absence of the ink at a replenishment liquid level E (an example of a third liquid level) in the internal space of the ink tank 181. The liquid level sensor 192 outputs a detection signal to the controller 130. The liquid level sensor 192 outputs an ON signal as a detection signal when the ink is detected, and outputs an OFF signal as a detection signal when the ink is not detected. The controller 130 determines whether the liquid level reaches the replenishment liquid level E in the internal space of the ink tank 181 based on the detection signal output from the liquid level sensor 192.

A pressure-reducing pump 193 is connected to the ink tank 181. The pressure-reducing pump 193 reduces a pressure in the internal space of the ink tank 181 by discharging a gas in the internal space of the ink tank 181 to the outside.

As illustrated in FIG. 3, a cap 62 is positioned below each ejection module 49. FIG. 3 illustrates only one ejection module 49. The cap 62 is implemented by an elastic body made of rubber, silicon or the like. The cap 62 has a box shape whose upper side is open. The cap 62 moves in the up-down direction 7 relative to the ejection module 49, thereby moving between a capping position at which the cap 62 covers the nozzle 38A of the ejection module 49 and an uncap position at which the cap 62 is separated from the ejection module 49. FIG. 3 illustrates the cap 62 at the capping position. The cap 62 includes a discharge port 21 through which the ink or the like flows out from an internal space 67 of the cap 62. The discharge port 21 is connected to a waste liquid tank 77 through a flow channel 178. A suction pump 74 is provided in the flow channel 178. The suction pump 74 is driven by a suction pump motor 58 (see FIG. 4).

The ink tank 181 communicates with the waste liquid tank 77 through a flow channel 184 (an example of a discharge channel). The waste liquid tank 77 is positioned below the ink tank 181. The preservation solution stored in the ink tank 181 can flow out to the waste liquid tank 77 through the flow channel 184 due to gravity. A discharge valve 188 is positioned in the flow channel 184. The discharge valve 188 is controlled by the controller 130 to open and close the flow channel 183.

Controller 130

Figure 4:
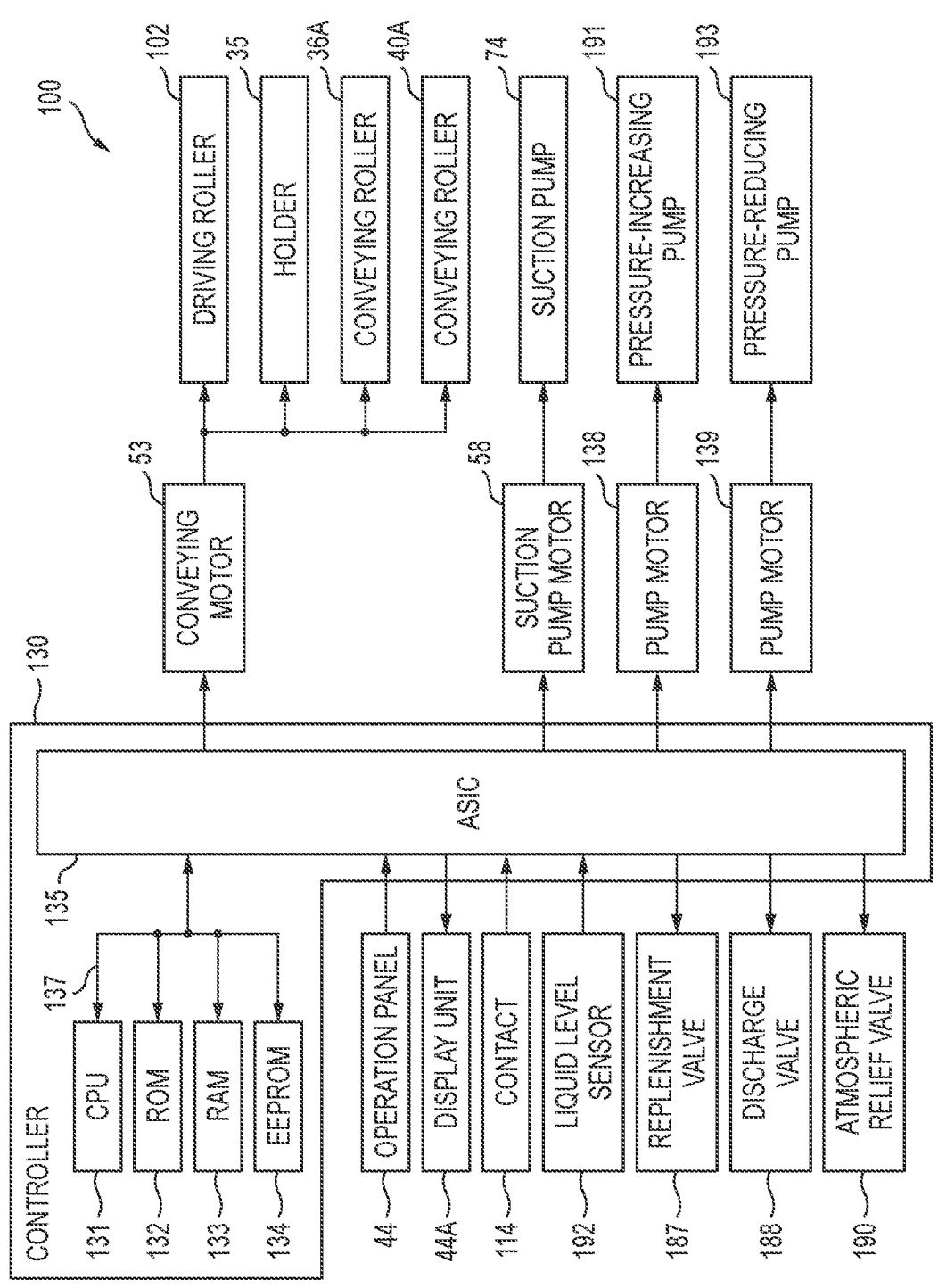
FIG. 4 is a block diagram illustrating a controller 130.

As illustrated in FIG. 4, the controller 130 includes a CPU 131, a ROM 132, a RAM 133, an EEPROM 134, and an ASIC 135 which are connected by an internal bus 137. The ROM 132 stores a program for controlling various operations of the CPU 131. The RAM 133 is used as a storage area for temporarily recording data, signals, and the like used when the CPU 131 executes the program, or as a work area for data processing. The EEPROM 134 stores, for example, settings, flags, ink supply dates and times, and the number of times of supply and discharge corresponding to an elapsed time, which should be held even after power-off. The number of times of supply and discharge is set in advance to increase as the elapsed time increases by the hour, for example.

A conveying motor 53, the suction pump motor 58, pump motors 138 and 139, the operation panel 44, a display unit 44A, the contact 114, and the liquid level sensor 192 are connected to the ASIC 135. The replenishment valve 187, the discharge valve 188, and the atmospheric relief valve 190 are connected to the ASIC 135. Each valve is connected to the ASIC 135 via a drive circuit for driving the valve.

The ASIC 135 generates a drive signal for rotating each motor, and controls each motor based on the drive signal. Each motor is rotated forwardly or reversely according to the drive signal from the ASIC 135. The controller 130 controls driving of the conveying motor 53 to rotate the holder 35, the conveying roller 36A, the conveying roller 40A, and a driving roller 102. The controller 130 controls driving of the suction pump motor 58 to drive the suction pump 74. The controller 130 controls driving of the pump motor 138 to drive the pressure-increasing pump 191. The controller 130 controls driving of the pump motor 139 to drive the pressure-reducing pump 193.

The operation panel 44, the display 44A, the contact 114, the liquid level sensor 192, and a piezoelectric element (not shown) are connected to the ASIC 35. The operation panel 44 outputs an operation signal corresponding to an operation performed by the user to the controller 130. The operation panel 44 may include, for example, a push button, or may include a touch sensor superimposed on a display. The display unit 44A displays that a cover member is mounted to a support member. The controller 130 performs reading and writing on the storage area of the IC board 70 of the ink cartridge 34 or the IC board 12 of the preservation solution cartridge 11 through the contact 114. The controller 130 receives a detection signal from the liquid level sensor 192. The controller 130 supplies power to the piezoelectric element via a drive circuit (not shown), whereby the piezoelectric element operates. The controller 130 controls the power supply to the piezoelectric element to selectively eject ink droplets from the plurality of nozzles 38A.

Ink

The ink will be described in detail below. The ink includes resin fine particles, a coloring material, an organic solvent, a surfactant, and water. The ink is a water-based ink.

The ink has wettability to hydrophobic recording media such as coated paper, plastic, film, and OHP sheets, and the present disclosure is not limited thereto. For example, the ink may be suitable for image recording on recording media such as plain paper, glossy paper, or matte paper. The "coated paper" refers to paper obtained by applying a coat agent to plain paper, in which pulp of high-grade printing paper or medium-grade printing paper is used as a main constituent element, in order to improve smoothness, whiteness, glossiness, and the like. Specifically, examples of the coated paper include high-grade coated paper and medium-grade coated paper.

As the resin fine particles, for example, those containing at least one of methacrylic acid and acrylic acid as a monomer can be used. For example, a commercially available product may be used. The resin fine particles may further contain, for example, styrene, vinyl chloride, or the like as a monomer. The resin fine particles may be contained in, for example, an emulsion. The emulsion includes, for example, resin fine particles and a dispersion medium (for example, water). The resin fine particles are not dissolved in the dispersion medium but dispersed in a specific particle size range. Examples of the resin fine particles include acrylic acid-based resins, maleic acid-based ester resins, vinyl acetate-based resins, carbonate resins, polycarbonate-based resins, styrene-based resins, ethylene-based resins, polyethylene-based resins, propylene-based resins, polypropylene-based resins, urethane-based resins, polyurethane-based resins, polyester-based resins, and copolymer resins thereof. The resin fine particles are preferably acrylic resins.

As the resin fine particles, for example, a resin having a glass transition temperature (Tg) in a range of 0° C. to 200° C., inclusive, is used. More preferably, the glass transition temperature (Tg) is from 20° C. to 180° C., inclusive, and more preferably from 30° C. to 150° C., inclusive.

As the emulsion, for example, a commercially available product may be used. Examples of commercially available products include "SUPERFLEX (registered trademark) 870" (Tg: 71° C.) and "SUPERFLEX (registered trademark) 150" (Tg: 40° C.) produced by DKS Co. Ltd., "MOWINYL (registered trademark) 6760" (Tg: −28° C.) and "MOWI-NYL (registered trademark) DM774" (Tg: 33° C.) produced by Japan Coating Resin Co. Ltd., "POLYSOL (registered trademark) AP-3270N" (Tg: 27° C.) produced by Showa Denko Co. Ltd., and "HIROS (registered trademark) KE-1062" (Tg: 112° C.) and "HIROS (registered trademark) QE-1042" (Tg: 69° C.) produced by Seiko PMC Corporation.

An average particle diameter of the resin fine particles is, for example, in a range of 30 nm to 200 nm, inclusive. The average particle diameter can be measured, for example, by using a dynamic light scattering particle size distribution analyzer "LB-550" produced by Horiba, Ltd., as an arithmetic average diameter.

The content (R) of the resin fine particles in the total amount of the ink is, for example, preferably in a range of 0.1 wt % to 30 wt %, inclusive, more preferably in a range of 0.5 wt % to 20 wt %, inclusive, and particularly preferably in a range of 1.0 wt % to 15.0 wt %, inclusive. One type of resin fine particle may be used or a combination of two or more types may be used.

The coloring material is, for example, a pigment dispersible in water based on a pigment dispersing resin (resin dispersant). Examples of the coloring material include carbon black, an inorganic pigment, and an organic pigment. Examples of the carbon black include furnace black, lamp black, acetylene black, and channel black. Examples of the inorganic pigment include titanium oxide, an iron oxide-based inorganic pigment, and a carbon black-based inorganic pigment. Examples of the organic pigment include: an azo pigment such as an azo lake pigment, an insoluble azo pigment, a condensed azo pigment, or a chelate azo pigment; a polycyclic pigment such as a phthalocyanine pigment, a perylene and perinone pigment, an anthraquinone pigment, a quinacridone pigment, a dioxin pigment, a thioindigo pigment, an isoindolinone pigment, or a quinophthalone pigment; a dye lake pigment such as basic dye type lake pigment or an acid dye type lake pigment; a nitro pigment; a nitroso pigment; and an aniline black daylight fluorescent pigment.

The solid content of the coloring material in the total amount of the ink is not particularly limited, and can be appropriately determined according to, for example, a desired optical density or color saturation. The solid content of the coloring material is, for example, preferably in a range of 0.1 wt % to 20.0 wt %, inclusive, and more preferably in a range of 1.0 wt % to 15.0 wt %, inclusive. The solid content of the coloring material is the weight of only the pigment, and does not include the weight of the resin fine particles. One type of coloring material may be used or a combination of two or more types may be used.

The organic solvent is not particularly limited, and any organic solvent may be used. Examples of the organic solvent include propylene glycol, ethylene glycol, 1,2-butanediol, propylene glycol monobutyl ether, dipropylene glycol monopropyl ether, triethylene glycol monobutyl ether, 1,2-hexanediol, and 1,6-hexanediol. A glycol ether having a propylene oxide group is preferable. Other examples of the organic solvent include: alkyl alcohols having 1 to 4 carbon atoms such as methyl alcohol, ethyl alcohol, n-propyl alcohol, isopropyl alcohol, n-butyl alcohol, sec-butyl alcohol, and tert-butyl alcohol; alkylene glycols having 2 to 6 carbon atoms such as ethylene glycol, propylene glycol, butylene glycol, triethylene glycol, 1,2,6-hexane triol, thiodiglycol, hexylene glycol, and diethyleneglycol; alkylene glycol lower alkyl ethers such as glycerin, ethylene glycol monomethyl (or ethyl, propyl, butyl) ether, diethylene glycol monomethyl (or ethyl, propyl, butyl) ether, triethylene glycol monomethyl (or ethyl, propyl, butyl, hexyl) ether, tetraethylene glycol monomethyl (or ethyl, propyl, butyl, hexyl) ether, propylene glycol monomethyl (or ethyl, propyl, butyl) ether, dipropylene glycol monomethyl (or ethyl, propyl, butyl) ether, tripropylene glycol monomethyl (or ethyl, propyl, butyl) ether, and tetraethylene glycol monomethyl (or ethyl) ether; and N-methyl-2-pyrolidone, 2-pyrroidone, and 1,3-dimethyl-2-imidazolidinone.

The content of the organic solvent as a liquid simple substance at 25° C. in the total amount of the ink is preferably 50 wt % or less, more preferably 40 wt % or less.

The water is preferably ion-exchanged water or pure water. The content of the water in the total amount of the ink is, for example, preferably in a range of 15 wt % to 95 wt %, inclusive, and more preferably in a range of 25 wt % to 85 wt %, inclusive. The content of the water may constitute, for example, the balance to the other components.

The ink may further contain a known additive as necessary. Examples of the additive include a surfactant, a pH adjuster, a viscosity modifier, a surface tension regulator, a preservative, an antifungal agent, a leveling agent, a defoaming agent, a light stabilizer, an antioxidant, a nozzle drying inhibitor, a polymer component such as an emulsion, and a dye. The surfactant may further contain a cationic surfactant, an anionic surfactant, and a nonionic surfactant. As the surfactants, for example, commercially available products may be used. Examples of the commercially available products include "OLFIN (registered trademark) E1010", "OLFIN (registered trademark) E1006", "OLFIN (registered trademark) E1004", "SILFACE SAG503A", and "SILFACE SAG002" produced by Nissin Chemical Industry Co., Ltd. The content of the surfactant in the total amount of the ink is, for example, 5 wt % or less, 3 wt % or less, or in a range of 0.1 wt % to 2 wt %, inclusive. Examples of the viscosity modifier include a polyvinyl alcohol, cellulose, and a water-soluble resin.

The ink can be prepared, for example, by uniformly mixing resin fine particles, a coloring material, an organic solvent, water, and, if necessary, an additive by a known method, and removing insoluble matter by a filter or the like.

Preservation Solution

The preservation solution contains a water-soluble polymer, a water-soluble organic solvent, a surfactant, and water.

The water-soluble polymer is not particularly limited, and any water-soluble polymer may be used. Examples of the water-soluble polymer include polyvinyl pyrrolidone and polyethylene glycol. Other water-soluble polymers include polyvinyl alcohols, polyvinyl pyrrolidones, polyacrylic acids, styrene-acrylic acid copolymers, and acrylic acid-acrylic acid ester copolymers. A commercially available product may be used as the water-soluble polymer. Examples of the commercially available product include JONCRYL (registered trademark) produced by BASF, AQUALIC (registered trademark) produced by Nippon Shokubai Co., Ltd., and ARON (registered trademark) produced by Toagosei Co., Ltd. The water-soluble polymer preferably contains an aromatic alkyl group or a lactam group in the structure thereof. A weight-average molecular weight of the water-soluble polymer is preferably in a range from 8500 to 20,000, and more preferably in a range from 9,000 to 15,000.

The water-soluble organic solvent is not particularly limited, and any water-soluble organic solvent may be used. Examples of the water-soluble organic solvent include ethylene oxide, propylene glycol, ethylene glycol, 1,2-butanediol, propylene glycol propyl ether, dipropylene glycol monopropyl ether, diethylene glycol monobutyl ether, triethylene glycol monobutyl ether, diethylene glycol monobutyl ether, and 1,6-hexanediol. A glycol ether having an ethylene oxide group is preferable. Other examples of the organic solvent include: alkyl alcohols having 1 to 4 carbon atoms such as methyl alcohol, ethyl alcohol, n-propyl alcohol, isopropyl alcohol, n-butyl alcohol, sec-butyl alcohol, and tert-butyl alcohol; alkylene glycols having 2 to 6 carbon atoms such as ethylene glycol, propylene glycol, butylene glycol, triethylene glycol, 1,2,6-hexane triol, thiodiglycol, hexylene glycol, and diethylene-glycol; alkylene glycol lower alkyl ethers such as glycerin, ethylene glycol monomethyl (or ethyl, propyl, butyl) ether, diethylene glycol monomethyl (or ethyl, propyl, butyl) ether, triethylene glycol monomethyl (or ethyl, propyl, butyl, hexyl) ether, tetraethylene glycol monomethyl (or ethyl, propyl, butyl, hexyl) ether, propylene glycol monomethyl (or ethyl, propyl, butyl) ether, dipropylene glycol monomethyl (or ethyl, propyl, butyl) ether, tripropylene glycol monomethyl (or ethyl, propyl, butyl) ether, and tetraethylene glycol monomethyl (or ethyl) ether; and N-methyl-2-pyrrolidone, 2-pyrroidone, and 1,3-dimethyl-2-imidazolidinone.

One type of water-soluble organic solvent may be used or a combination of two or more types may be used. The content of the water-soluble organic solvent in the total amount of the preservation solution is, for example, preferably in a range of 5 wt % to 50 wt %, inclusive, and more preferably in a range of 25 wt % to 35 wt %, inclusive.

As the surfactant, for example, a commercially available product may be used. Examples of the commercially available anionic surfactant include SUNNOL (registered trademark) produced by Lion Corporation, EMAL (registered trademark) produced by Kao Corporation, and SANDET (registered trademark) and BEAULIGHT (registered trademark) produced by Sanyo Chemical Industries, Ltd. One type of anionic surfactant may be used or a combination of two or more types may be used. The content of the anionic surfactant in the total amount of a preservation solution is, for example, preferably in a range of 0.01 wt % to 10 wt %, inclusive, and more preferably in a range of 0.1 wt % to 10 wt %, inclusive.

The surfactant contained in the preservation solution may be only an anionic surfactant, or may further contain a cationic surfactant or a nonionic surfactant in addition to the anionic surfactant.

The water is preferably ion-exchanged water or pure water. The content of water in the total amount of the preservation solution is, for example, 10 wt % to 90 wt %, and 20 wt % to 80 wt %. The content of the water may constitute, for example, the balance to the other components.

The preservation solution preferably contains no colorant, but may contain a colorant. When the preservation solution contains a colorant, it is preferable that the colorant is at an amount that does not affect a recorded image.

The preservation solution may further contain a known additive as necessary. Examples of the additive include a wetting agent, a pH adjuster, a viscosity modifier, a surface tension regulator, and an antifungal agent. Examples of the viscosity modifier include a polyvinyl alcohol, cellulose, and a water-soluble resin.

The preservation solution can be prepared, for example, by uniformly mixing a water-soluble polymer, a water-soluble organic solvent, a surfactant, and water by a known method.

Viscosity of the preservation solution is preferably smaller than viscosity of the ink. The viscosity of the ink and the preservation solution can be measured by, for example, a cone plate-type rotational viscometer.

Image Recording Processing

Hereinafter, processing (image recording processing) performed when recording an image on the sheet S will be described. Image recording and maintenance processing such as purging and flushing are executed in a recording mode. In other words, in the present embodiment, the recording mode is not a preservation mode.

Prior to the image recording processing, the ink cartridge 34 is mounted in the cartridge mounting portion 110, and the ink is supplied from the ink cartridge 34 to the ink tank 181.

Figure 5:
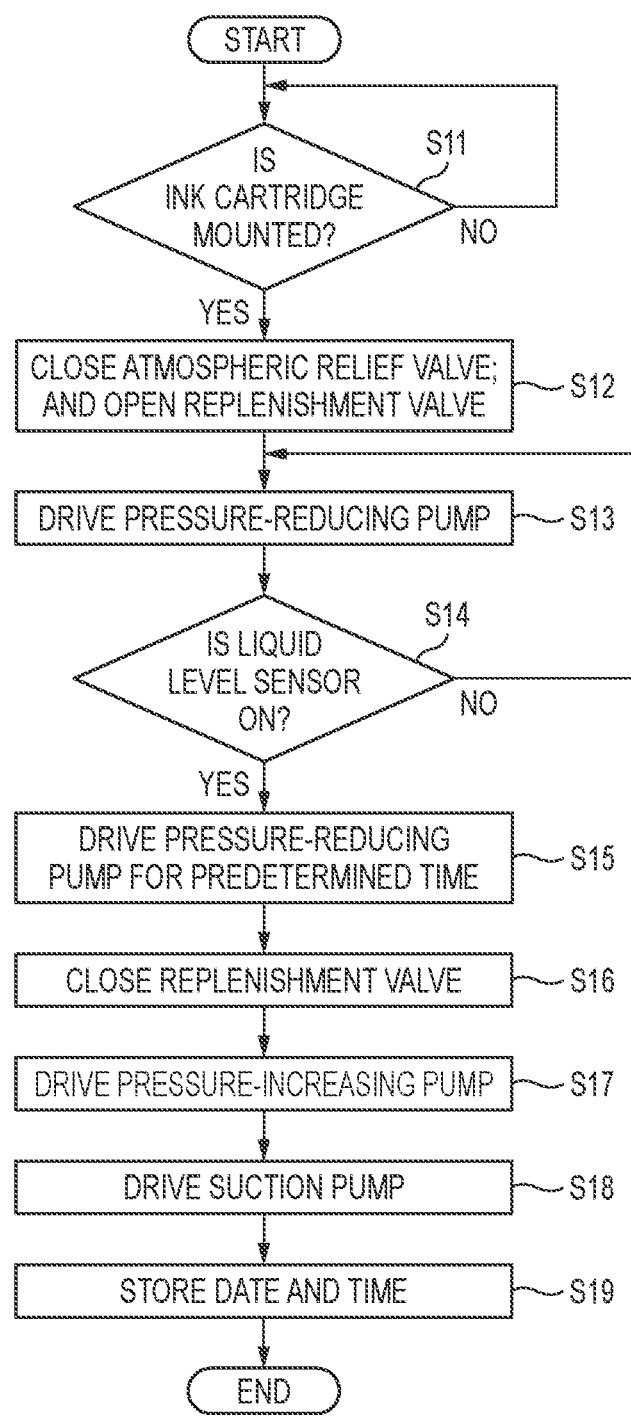
FIG. 5 is a flowchart illustrating processing of filling an ink from an ink cartridge 34 into an ink tank 181.

As illustrated in FIG. 5, the controller 130 determines whether the ink cartridge 34 is mounted in the cartridge mounting portion 110 (S11). Specifically, by reading the identification information stored in the storage area of the IC board 70 through the contact 114, the controller 130 determines whether the ink cartridge 34 is mounted in the cartridge mounting portion 110. In response to determining that the ink cartridge 34 is not mounted in the cartridge mounting portion 110 (S11: No), the controller 130 displays, on the display unit 44A, a notification of mounting the ink cartridge 34, and remains on standby until the ink cartridge 34 is mounted.

In response determining that the ink cartridge 34 is mounted in the cartridge mounting portion 110 (S11: Yes), the controller 130 closes the atmospheric relief valve 190 and opens the replenishment valve 187 (S12). Thereafter, the controller 130 drives the pressure-reducing pump 193 (S13).

When the pressure-reducing pump 193 is driven, a pressure in the internal space of the ink tank 181 is negative, and thus the ink stored in the ink cartridge 34 is supplied to the ink tank 181 through the flow channel 182.

When a detection signal from the liquid level sensor 192 of the ink tank 181 is an OFF signal (S14: No), the controller 130 continues to drive the pressure-reducing pump 193 (S13). When the detection signal from the liquid level sensor 192 is an ON signal (S14: Yes), the controller 130 drives the pressure-reducing pump 193 for a predetermined time and then stops the pressure-reducing pump 193 (S15). Since the pressure-reducing pump 193 is driven for a predetermined time after the detection signal from the liquid level sensor 192 is the ON signal, the ink is stored up to a FULL liquid level F (an example of a first liquid level) of the ink tank 181.

The controller 130 closes the replenishment valve 187 (S16), and drives the pressure-increasing pump 191 for a certain period of time (S17). When the pressure-increasing pump 191 is driven, the ink is supplied from the ink tank 181 to the ejection module 49 through the flow channel 183.

After stopping the pressure-increasing pump 191, the controller 130 drives the suction pump 74 for a certain period of time (S18). When the suction pump 74 is driven, a pressure in the internal space 67 of the cap 62 is negative, the ink is discharged from the ejection module 49 to the internal space 67 of the cap 62 through the nozzle 38A, and the ink is discharged to the waste liquid tank 77 through the flow channel 178. Thereafter, the controller 130 stores a current date and time as an ink supply date and time in the EEPROM 134 and enters a standby state (S19).

When receiving a command to record an image on the sheet S from the outside, such as the operation panel 44 and an information processing apparatus connected to the image recording apparatus 100 via a LAN or the like, the controller 130 separates the cap 62 from the ejection module 49. Although not shown in the drawings, the controller 130 may perform processing such as wiping and flushing after separating the cap 62 from the ejection module 49.

Next, the controller 130 starts conveying the sheet S, and ejects the ink from the nozzle 38A when the sheet S is positioned directly below the head 38. Accordingly, an image is recorded on the sheet S. The ink adhering to the sheet S is fixed to the sheet S by being heated when passing through the heater 39. The sheet S being further conveyed is checked for the recorded image by the CIS 25, cut into a predetermined size by the cutter unit 26 and then discharged.

After the image recording processing on the sheet S, the controller 130 brings the cap 62 into contact with the ejection module 49 to perform capping, and enters the standby state.

Figure 6:
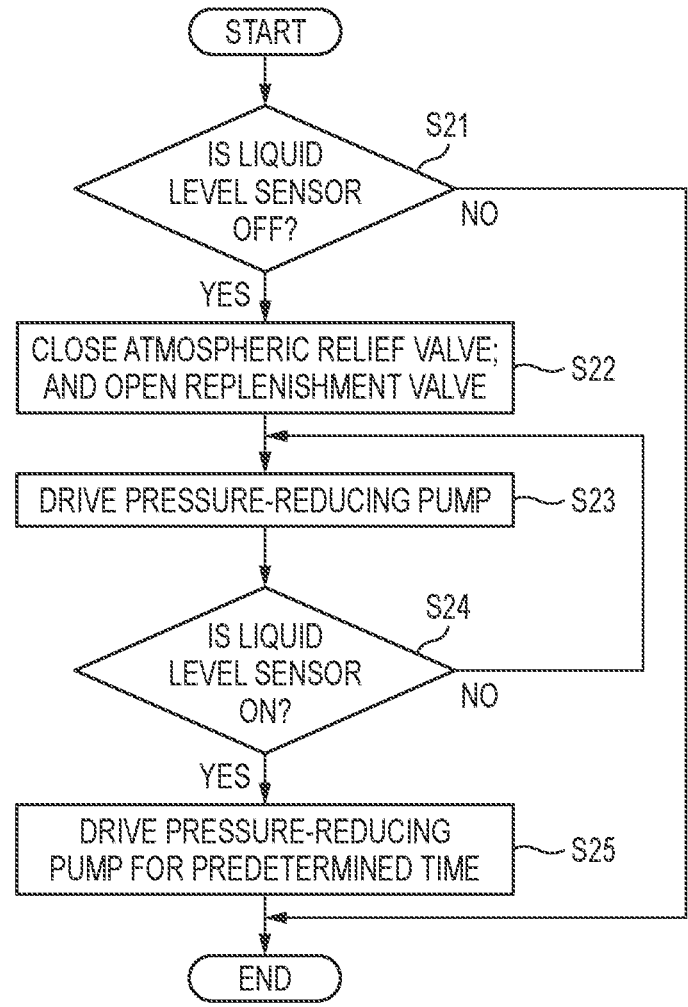
FIG. 6 is a flowchart illustrating processing of filling an ink from the ink cartridge 34 into the ink tank 181.

After the image recording processing, the controller 130 executes ink replenishment processing. As illustrated in FIG. 6, when the detection signal from the liquid level sensor 192 is not an OFF signal (S21: No), the controller 130 ends the ink replenishment processing.

When the detection signal from the liquid level sensor 192 is an OFF signal (S21: Yes), the controller 130 closes the atmospheric relief valve 190 and opens the replenishment valve 187 (S22). Thereafter, the controller 130 drives the pressure-reducing pump 193 (S23).

When the pressure-reducing pump 193 is driven, the pressure in the internal space of the ink tank 181 is negative, and thus the ink stored in the ink cartridge 34 is supplied to the ink tank 181 through the flow channel 182.

When the detection signal from the liquid level sensor 192 of the ink tank 181 is not an ON signal (S24: No), the controller 130 continues to drive the pressure-reducing pump 193 (S23). When the detection signal from the liquid level sensor 192 is an ON signal (S24: Yes), the controller 130 drives the pressure-reducing pump 193 for a predetermined time and then stops the pressure-reducing pump 193 (S25). Since the pressure-reducing pump 193 is driven for a predetermined time after the detection signal from the liquid level sensor 192 is the ON signal, the ink is stored up to the FULL liquid level in the ink tank 181. Then, the controller 130 ends the ink replenishment processing.

Preservation Processing

Figure 7:
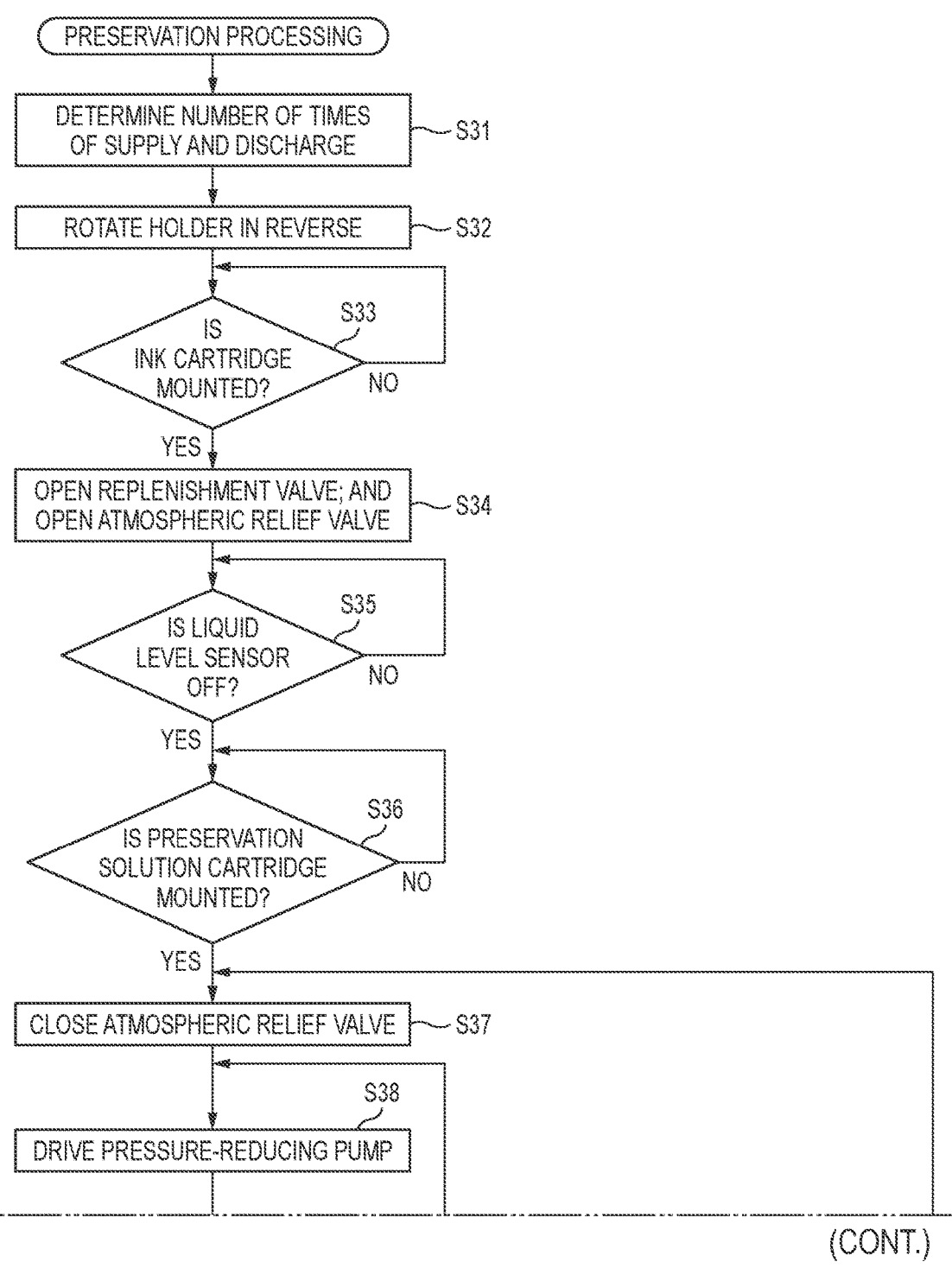
FIG. 7 is a flowchart illustrating preservation processing.

The preservation processing will be described below with reference to FIG. 7. The preservation processing is executed in the image recording apparatus 100 when the user instructs execution of the preservation processing. Examples of the case where the user instructs the execution of the preservation processing include a case where the image recording apparatus 100 will not be used over a long period of time. The term "long period of time" refers to, for example, one month or more, but is not limited thereto.

The image recording apparatus 100 is in a standby state. In the standby state, when receiving a preservation instruction command based on the input of the operation panel 44, the controller 130 shifts from the recording mode to the preservation mode and executes the preservation processing. Upon receiving the preservation instruction command, the controller 130 causes the display unit 44A of the operation panel 44 to display a notification of being the preservation mode and a notification of not removing the ink cartridge 34.

The controller 130 reads, from the EEPROM 134, the date and time when the ink is lastly supplied from the ink cartridge 34 to the ink tank 181 in the recording mode before the shift. Then, the controller 130 calculates an elapsed time based on the read date and time and a date and time at which the preservation instruction command is received, and determines the number of times of supply and discharge K in accordance with the calculated elapsed time (S31). The number of times of supply and discharge K means the number of times of supplying the preservation solution from the preservation solution cartridge 11 to the ink tank 181. When the number of times of supply and discharge K is 2, the preservation solution is supplied from the preservation solution cartridge 11 to the ink tank 181 and then is discharged from the ink tank 181, and the preservation solution is supplied again from the preservation solution cartridge 11 to the ink tank 181.

The controller 130 drives the conveying motor 53 in a reverse direction for a certain period to rotate the driving roller 102, the holder 35, and the conveying rollers 36A and 40A in a reverse direction to the conveyance direction 8A (S32). Accordingly, the sheet S positioned in the conveyance path 43 moves in the reverse direction to the conveyance direction 8A and is wound around the roll body 37.

After stopping the conveying motor 53, the controller 130 determines whether the ink cartridge 34 is mounted in the cartridge mounting portion 110 (S33). Specifically, by reading the identification information stored in the storage area of the IC board 70 through the contact 114, the controller 130 determines whether the ink cartridge 34 is mounted in the cartridge mounting portion 110. In response determining that the ink cartridge 34 is not mounted in the cartridge mounting portion 110 (S33: No), the controller 130 displays, on the display unit 44A, a notification of mounting the ink cartridge 34 and remains on standby until the ink cartridge 34 is mounted.

In response determining that the ink cartridge 34 is mounted in the cartridge mounting portion 110 (S33: Yes), the controller 130 opens the replenishment valve 187 and the atmospheric relief valve 190 (S34). Accordingly, the ink stored in the ink tank 181 is returned to the ink cartridge 34 through the flow channel 182 due to gravity, and the ink is not stored in the ink tank 181. In the ink tank 181, the ink may not be completely drained. For example, the ink below a position of the flow channel 182 that opens in the internal space of the ink tank 181 does not return to the ink cartridge 34 due to gravity, and some ink may remain in the internal space of the ink tank 181.

When the detection signal from the liquid level sensor 192 of the ink tank 181 is an OFF signal (S35: Yes), the controller 130 displays, on the display unit 44A, a notification of mounting the preservation solution cartridge 11 in place of the ink cartridge 34, and determines whether the preservation solution cartridge 11 is mounted in the cartridge mounting portion 110 (S36). Specifically, by reading out the identification information stored in the storage area of the IC board 12 through the contact 114, the controller 130 determines whether the preservation solution cartridge 11 is mounted in the cartridge mounting portion 110. In response determining that the preservation solution cartridge 11 is not mounted in the cartridge mounting portion 110 (S36: No), the controller 130 displays, on the display unit 44A, a notification of mounting the preservation solution cartridge 11, and remains on standby until the preservation solution cartridge 11 is mounted.

In response determining that the preservation solution cartridge 11 is mounted in the cartridge mounting portion 110 (S36: Yes), the controller 130 closes the atmospheric relief valve 190 (S37). Thereafter, the controller 130 drives the pressure-reducing pump 193 (S38).

When the pressure-reducing pump 193 is driven, the pressure in the internal space of the ink tank 181 is negative, and thus the ink stored in the preservation solution cartridge 11 is supplied to the ink tank 181 through the flow channel 182.

When the detection signal from the liquid level sensor 192 of the ink tank 181 is not an ON signal (S39: No), the controller 130 continues to drive the pressure-reducing pump 193 (S38). When the detection signal from the liquid level sensor 192 is an ON signal (S39: Yes), the controller 130 drives the pressure-reducing pump 193 for a predetermined time and then stops the pressure-reducing pump 193 (S40). Accordingly, the preservation solution is stored up to a HIGH liquid level H (an example of a second liquid level) of the ink tank 181.

Figure 8:
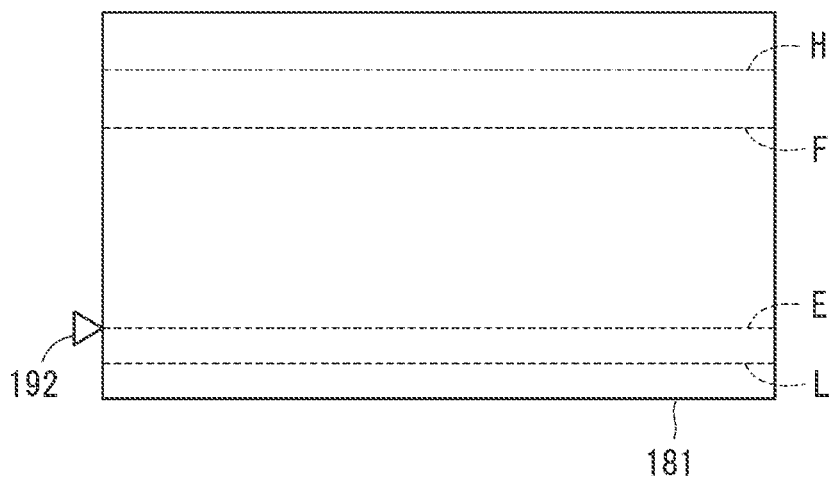
FIG. 8 is a schematic diagram illustrating positions of respective liquid levels in the ink tank 181.

As illustrated in FIG. 8, the HIGH liquid level H of the ink tank 181 is higher than the FULL liquid level F. Accordingly, the preservation solution comes into contact with all the areas of an inner surface of the ink tank 181 with which the ink was in contact in the recording mode.

The controller 130 drives the pressure-increasing pump 191 for a certain period (S41). When the pressure-increasing pump 191 is driven, the preservation solution is supplied from the ink tank 181 to the ejection module 49 through the flow channel 183.

After stopping the pressure-increasing pump 191, the controller 130 drives the suction pump 74 for a predetermined time (S42). When the suction pump 74 is driven, a pressure in the internal space 67 of the cap 62 is negative, the preservation solution is discharged from the ejection module 49 to the internal space 67 of the cap 62 through the nozzle 38A, and the preservation solution is discharged to the waste liquid tank 77 through the flow channel 178. Accordingly, the preservation solution is supplied from the ink tank 181 to the ejection module 49 through the flow channel 183. The preservation solution stored in the preservation solution cartridge 11 is supplied to the ink tank 181 through the flow channel 182.

After stopping the suction pump 74, the controller 130 counts up the number of times of supply and discharge N by 1 (N=N+1, S43), and determines whether the counted number of times of supply and discharge N is the determined number of times of supply and discharge K (S44).

In response determining that the number of times of supply and discharge N is not the number of times of supply and discharge K (S44: No), the controller 130 opens the atmospheric relief valve 190 and the discharge valve 188 (S45). Accordingly, the preservation solution stored in the ink tank 181 flows out to the waste liquid tank 77 through the flow channel 184 due to gravity.

When the detection signal from the liquid level sensor 192 is not an OFF signal (S46: No), the controller 130 remains on standby. When the detection signal from the liquid level sensor 192 is an OFF signal (S46: Yes), the controller 130 closes the discharge valve after a predetermined time elapses (S47). Accordingly, an outflow of the preservation solution from the ink tank 181 to the waste liquid tank 77 stops. When the detection signal from the liquid level sensor 192 is an OFF signal, the liquid level of the preservation solution is lower than the replenishment liquid level E in the ink tank 181. Further, after the predetermined time elapses, the liquid level of the preservation solution in the ink tank 181 is at a LOW liquid level L (an example of a fourth liquid level) lower than the replenishment liquid level E, and most of the preservation solution stored in the ink tank 181 is discharged to the waste liquid tank 77. Thereafter, the controller 130 executes the steps S37 to S44. The processing from step S37 to step S47 is an example of supply and discharge processing.

In response determining that the number of times of supply and discharge N is the number of times of supply and discharge K (S44: Yes), the controller 130 resets the number of times of supply and discharge N to zero, turns a preservation flag stored in the EEPROM 134 to ON (S48) and turns off power supply of the image recording apparatus 100 (S49). Accordingly, the preservation processing ends.

Operation and Effect of Embodiment

Since the ink is stored in the ink tank 181 in the recording mode, the ink may adhere to a wall surface up to near the FULL liquid level F in the ink tank 181. In the preservation mode, since the preservation solution is supplied up to the HIGH liquid level H higher than the FULL liquid level F, the ink adhering to the wall surface of the ink tank 181 can be removed by the preservation solution.

Since the supply and discharge of the preservation solution are repeated in the ink tank 181, the preservation solution is brought into dynamic contact with the ink remaining on the wall surface of the ink tank 181. Accordingly, the ink remaining on the wall surface of the ink tank 181 is easily removable.

In addition, in step S47, the preservation solution is discharged from the ink tank 181 until the liquid level reaches the LOW liquid level L, which is lower than the replenishment liquid level E. The liquid level of the preservation solution fluctuates in the up-down direction outside a range in which the liquid levels of the ink are present in the ink tank 181 in the recording mode, that is, in a wider range including the replenishment liquid level E and the FULL liquid level F. Accordingly, the ink adhering to the wall surface of the ink tank 181 hardly remains.

Further, as the elapsed time from the date and time at which the ink is lastly supplied from the ink cartridge 34 to the ink tank 181 in the recording mode before the shift to the preservation mode increases, the amount of ink remaining on the wall surface of the ink tank 181 tends to increase. In step S31, the elapsed time is calculated based on the date and time when the ink is lastly supplied from the ink cartridge 34 to the ink tank 181 and the date and time when the preservation instruction command is received, and the number of times of supply and discharge K is determined to increase as the calculated elapsed time increases. Accordingly, the number of times that the preservation solution comes into dynamic contact with the ink remaining on the wall surface of the ink tank 181 increases according to the amount of ink remaining on the wall surface of the ink tank 181.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification

In the above-described embodiment, in step S31, the elapsed time is calculated based on the date and time when the ink is lastly supplied from the ink cartridge 34 to the ink tank 181 and the date and time when the preservation instruction command is received, and the number of times of supply and discharge K is determined to increase as the calculated elapsed time increases. The present disclosure is not limited thereto.

For example, instead of determining the number of times of supply and discharge K, the controller 130 may change a pressure reduction value associated with driving the pressure-reducing pump 193 in step S38, in accordance with the elapsed time from when the ink is lastly supplied to the ink tank 181 in the recording mode to when a command of the preservation mode is received again.

When the pressure reduction value associated with driving the pressure-reducing pump 193 changes, a flow rate of the preservation solution flowing into the ink tank 181 from the preservation solution cartridge 11 changes. As the elapsed time increases, the amount of ink remaining on the wall surface of the ink tank 181 tends to increase. When the flow rate of the preservation solution increases as the elapsed time increases, a speed at which the preservation solution dynamically comes into contact with the ink remaining on the wall surface of the ink tank 181 increases in accordance with the amount of ink remaining on the wall surface of the ink tank 181.

Instead of determining the number of times of supply and discharge K, the controller 130 may change the HIGH liquid level H at the time of supplying the preservation solution to the ink tank 181 in step S40 or change the LOW liquid level L after the preservation solution is discharged from the ink tank 181 in step S47, in accordance with the elapsed time from when the ink is lastly supplied to the ink tank 181 in the recording mode to when a command of the preservation mode is received again.

When the HIGH liquid level H increases or the LOW liquid level L decreases as the elapsed time increases, the speed at which the preservation solution comes into dynamic contact with the ink remaining on the wall surface of the ink tank 181 increases in accordance with the amount of ink remaining on the wall surface of the ink tank 181.

In the above-described embodiment, the preservation solution is discharged from the ink tank 181 until the liquid level reaches the LOW liquid level L in steps S46 and S47. Alternatively, the preservation solution may be discharged from the ink tank 181 until the liquid level reaches a liquid level position that is lower than the FULL liquid level F and higher than the replenishment liquid level E. In this case, a pump may be provided in place of the discharge valve 188 in the flow channel 184. When the pump is driven, the preservation solution is discharged from the ink tank 181 to the waste liquid tank 77. But in the supply and discharge processing repeatedly performed by the number of times of supply and discharge K, the preservation solution may be returned from the flow channel 184 to the ink tank 181 by driving the pump in a reverse flow direction, without supplying the new preservation solution from the preservation solution cartridge 11 to the ink tank 181 for the second time.

In the above-described embodiment, when the pressure-reducing pump 193 is driven, the ink or the preservation solution is supplied from the ink cartridge 34 or the preservation solution cartridge 11 to the ink tank 181, and the liquid level sensor 192 outputs the ON signal, and then the pressure-reducing pump 193 is further driven for a predetermined time. Accordingly, in the ink tank 181, the ink is supplied up to the FULL liquid level F, or the preservation solution is supplied up to the HIGH liquid level H, but the present disclosure is not limited thereto. For example, in the ink tank 181, a liquid level sensor may be provided for each of the FULL liquid level F, the HIGH liquid level H, and the LOW liquid level L. Based on detection signals of the liquid level sensors, the liquid level of the ink or the preservation solution in the ink tank 181 may be determined, and the driving of the pressure-reducing pump 193 may be controlled.

In the image recording apparatus 100, the ink cartridge 34 and the preservation solution cartridge 11 are separate from each other and are replaced in the cartridge mounting portion 110. Alternatively, the ink cartridge 34 and the preservation solution cartridge 11 may be integrated and mounted in the cartridge mounting portion 110. In this case, in particular, the controller 130 may perform the preservation processing at appropriate times, for example, when printing is not performed for a certain period.

The preservation processing may be executed based on a user instruction or may be executed on condition that an input to the image recording apparatus 100 is not performed for a certain period. However, when the image recording apparatus 100 is not used over a long period of time, it is assumed that power is not supplied to the image recording apparatus 100 due to detachment of a power plug or the like, and it is assumed that the controller 130 does not perform functions since power is not supplied. Therefore, if the preservation processing can be executed according to a user's needs, the convenience is improved.

Although an ink is described as an example of the liquid in the above-described embodiment, for example, instead of the ink, the liquid may be a pretreatment liquid to be ejected onto a sheet or the like prior to an ink during printing or a post-treatment liquid for overcoating the ink adhering to the sheet. The preservation solution may be used as a cleaning solution for cleaning the head 38.

What is claimed is:

1. A liquid supply device comprising:
a cartridge mounting portion configured to allow a cartridge to be mounted therein;
a tank;
a head configured to eject an ink supplied from the tank;
a first liquid supply channel connecting the cartridge mounting portion and the tank;
a second liquid supply channel connecting the tank and the head; and
a controller,
wherein the cartridge includes a first cartridge storing the ink and a second cartridge storing a preservation solution, the first cartridge and the second cartridge being separate from each other, and selectively mountable in the cartridge mounting portion, and
wherein the controller is configured to:
cause, in a recording mode, the ink to be stored in the tank such that a maximum liquid level of the ink is a first liquid level; and
cause, on condition that the controller receives a command of a preservation mode, the preservation solution to be supplied from the second cartridge to the tank through the first liquid supply channel so as to reach a second liquid level higher than the first liquid level.

2. The liquid supply device according to claim 1, further comprising:

a discharge channel through which a liquid is allowed to be discharged from the tank, wherein the controller is configured to, in the preservation mode, control a pressure in the tank to perform supply and discharge processing of repeating supply and discharge of the preservation solution between the tank and the discharge channel.

3. The liquid supply device according to claim 2, further comprising:

a sensor configured to detect a liquid level in the tank reaching a third liquid level lower than the first liquid level, wherein the controller is configured to, in the recording mode, cause the ink to be supplied from the first cartridge to the tank through the first liquid flow channel in response to a detection signal output from the sensor.

4. The liquid supply device according to claim 3, wherein the controller is configured to cause the preservation solution to be discharged from the tank until the liquid level in the tank reaches a fourth liquid level lower than the third liquid level in the supply and discharge processing.

5. The liquid supply device according to claim 4, wherein the controller is configured to:

obtain, after the preservation mode is executed, an elapsed time from when the ink is supplied to the tank in the recording mode to when the command of the preservation mode is received again; and determine, in accordance with the elapsed time, a number of times of repeating supply and discharge in the supply and discharge processing in the preservation mode.

6. The liquid supply device according to claim 4, wherein the controller is configured to:

obtain, after the preservation mode is executed, an elapsed time from when the ink is supplied to the tank in the recording mode to when the command of the preservation mode is received again; and determine, in accordance with the elapsed time, a flow rate of the preservation solution in the supply and discharge processing in the preservation mode.

7. The liquid supply device according to claim 4, wherein the controller is configured to:

obtain, after the preservation mode is executed, an elapsed time from when the ink is supplied to the tank in the recording mode to when the command of the preservation mode is received again; and change, in accordance with the elapsed time, the second liquid level, the fourth liquid level, or both in the preservation mode.

8. The liquid supply device according to claim 1, wherein the controller is configured to, on condition that the controller receives the command of the preservation mode, return the ink from the tank to the first cartridge mounted in the cartridge mounting portion through the first liquid flow channel, before supplying the preservation solution from the second cartridge to the tank through the first liquid supply channel.

9. The liquid supply device according to claim 1, wherein the ink contains a coloring material, an organic solvent, a surfactant, and water, and wherein the preservation solution contains an organic solvent, a surfactant, and water.

10. The liquid supply device according to claim 9, wherein the coloring material is a pigment, and wherein the ink further contains a resin fine particle.

11. The liquid supply device according to claim 10, wherein the resin fine particle contains an acrylic resin.

12. The liquid supply device according to claim 9, wherein the preservation solution further contains a water-soluble polymer.

13. The liquid supply device according to claim 1, wherein the recording mode is allowed when the first cartridge is mounted in the cartridge mounting portion, and wherein the preservation mode is allowed when the second cartridge is mounted in the cartridge mounting portion.

14. A liquid supply method for a liquid supply device in which an ink is supplied from an ink cartridge mounted in a cartridge mounting portion to a tank and the ink supplied from the tank is ejected by a head, the liquid supply method comprising:

supplying, in a recording mode, the ink from the ink cartridge to the tank such that a maximum liquid level of the ink is a first liquid level; and supplying, in a preservation mode, a preservation solution from a preservation solution cartridge mounted in the cartridge mounting portion to the tank so as to reach a second liquid level higher than the first liquid level.

* * * * *